United States Patent
Ando et al.

(10) Patent No.: US 7,361,118 B2
(45) Date of Patent: Apr. 22, 2008

(54) GEAR MECHANISM AND REDUCTION PLANETARY GEAR

(75) Inventors: Teruhisa Ando, Fuwa-gun (JP);
Masataka Kojima, Fuwa-gun (JP);
Masahiro Tsunemi, Kobe (JP);
Hidekazu Okufuji, Kobe (JP)

(73) Assignees: NABCO Limited, Hyogo-ken (JP); TS Corporation, Minato-ku (JP)

( * ) Notice: Subject to any disclaimer, the term of this patent is extended or adjusted under 35 U.S.C. 154(b) by 0 days.

(21) Appl. No.: 11/633,578

(22) Filed: Dec. 5, 2006

(65) Prior Publication Data

US 2007/0099747 A1    May 3, 2007

Related U.S. Application Data

(62) Division of application No. 10/893,930, filed on Jul. 20, 2004, now abandoned.

(51) Int. Cl.
*F16H 57/08* (2006.01)
*F16H 55/17* (2006.01)

(52) U.S. Cl. ........................ 475/344; 74/438

(58) Field of Classification Search .................. 475/5, 475/72, 337, 344, 903; 74/431, 438, 457, 74/460, 462
See application file for complete search history.

(56) References Cited

U.S. PATENT DOCUMENTS

| | | | |
|---|---|---|---|
| 4,640,149 A | 2/1987 | Drago | |
| 4,942,781 A * | 7/1990 | Hori | 475/342 |
| 5,593,360 A * | 1/1997 | Ishida et al. | 475/331 |
| 5,868,643 A * | 2/1999 | Teraoka et al. | 475/252 |
| 5,951,424 A * | 9/1999 | Briceland | 475/72 |
| 6,282,502 B1 | 8/2001 | Sundaresan et al. | |
| 6,537,167 B1 * | 3/2003 | Gazyakan et al. | 475/5 |
| 6,682,456 B2 | 1/2004 | Allen et al. | |
| 6,837,123 B2 | 1/2005 | Hawkins | |
| 6,964,210 B2 | 11/2005 | Colbourne | |

FOREIGN PATENT DOCUMENTS

| | | | |
|---|---|---|---|
| GB | 2224554 A * | 5/1990 | |
| JP | 05-042812 | 6/1993 | |
| JP | 405340463 A * | 12/1993 | |
| JP | 10-246173 | 9/1998 | |
| JP | 11-022789 | 1/1999 | |
| JP | 2002-097668 | 4/2002 | |

* cited by examiner

*Primary Examiner*—Roger Pang
(74) *Attorney, Agent, or Firm*—Nixon Peabody LLP; Donald R. Studebaker

(57) ABSTRACT

In a gear mechanism, inner gear teeth and outer gear teeth are formed of high-tooth. An engagement ratio of the inner and outer gear teeth is configured so as to be 2.0 or more, whereby a load can be transferred between the inner and outer teeth via a continuous gear engagement of at least two pairs of gear teeth thereof. Accordingly, a contact face pressure and a bending stress occurring to inner and outer gear teeth can be reduced, the limitation of the durability of the gear mechanism due to the large difference of durability between the inner and outer gear teeth can be improved, and the necessity of increasing hardness of the inner gear teeth can be lessened.

1 Claim, 12 Drawing Sheets

GEAR MECHANISM AND REDUCTION PLANETARY GEAR

This application is Divisional of U.S. application Ser. No. 10/893,930 filed Jul. 20, 2004 now abondoned.

BACKGROUND OF THE INVENTION

The present invention relates to a gear mechanism comprising inner gear teeth formed at a first gear element and outer gear teeth formed at a second gear element and engaged with the inner gear teeth, and a reduction planetary gear comprising a sun gear, a planetary gear mechanism driveably engaged with the sun gear, a ring gear including inner gear teeth formed inside thereof and driveably engaged with the planetary gear mechanism, and a case rotatably supporting the ring gear.

Conventionally, such gear mechanism comprising inner gear teeth formed at the first gear element and outer gear teeth formed at the second gear element and engaged with the inner gear teeth is known (see, e. g., Japanese Patent Laid-Open Publication Nos. 10-246173, 11-22789, and 2002-97668).

A gear mechanism disclosed in the Japanese Patent Laid-Open Publication No. 10-246173 is a multiplying planetary gear used for a windmill or the like, which transfers a rotation of a ring gear conveyed from an input shaft to an output shaft with speed multiplying. A gear mechanism disclosed in the Japanese Patent Laid-Open Publication No. 11-22789 is a reduction planetary gear used for a running drive device of a construction machine or the like, which transfers a rotation of a hydraulic pressure motor to a housing as a driven rotational member with speed reducing and drives the housing. A gear mechanism disclosed in the Japanese Patent Laid-Open Publication No. 2002-97668 is a turning device for the construction machine, which transfers a rotation of the hydraulic pressure motor provided at an upper end thereof to an output shaft with speed reducing via a reduction planetary gear, thereby turning an upper part with respect to an lower running part thereof. These gear mechanisms disclosed in the above publications comprise inner gear teeth formed at the first gear element and outer gear teeth formed at the second gear element and engaged with the inner gear teeth, and transfer the input rotation with speed multiplying or reducing.

Herein, in the gear mechanisms disclosed in the above publications, the outer gear teeth tend to be extremely less durable compared to the inner gear teeth in the case where they are formed of the same material. That is, since the inner gear teeth located outside have a larger tooth thickness of its gear tooth base than the outer gear teeth and the outer gear teeth located inside are engaged more often than the inner gear teeth because the gear element with the outer gear teeth has a smaller diameter than that with the inner gear teeth, the outer gear teeth tend to be extremely less durable compared to the inner gear teeth in the case where they are formed of the same material. Thus, when the transfer load between the inner and outer gear teeth increases, a contact face pressure and a bending stress which occur accordingly increase as well. As a result, there occurs a large difference of durability between the inner and outer gear teeth, and thereby the durability of the gear mechanism is limited eventually by the outer gear teeth with less durability. Herein, in the event that larger contact face pressure and bending stress occur to the inner and outer gear teeth, increasing hardness of the outer gear teeth might be considered in order to improve the durability thereof. However, it may result in a further deterioration of the durability of the inner gear teeth, and thereby increasing hardness of the inner gear teeth will be needed contrarily.

Thus, it is needed to provide the gear mechanism which can reduce the contact face pressure and the bending stress occurring to the inner and outer gear teeth, improve the limitation of the durability of the gear mechanism due to the large difference of durability between the inner and outer gear teeth, and lessen the necessity of increasing hardness of the inner gear teeth.

Meanwhile, the reduction planetary gear, which comprises the sun gear, the planetary gear mechanism driveably engaged with the sun gear, the ring gear including inner gear teeth formed inside thereof and driveably engaged with the planetary gear mechanism, and the case rotatably supporting the ring gear, is known (see, e. g., Japanese Patent Laid-Open Publication No. 11-22789, and Japanese Utility-Model Laid-Open Publication No. 5-42812). A reduction planetary gear disclosed in the Japanese Patent Laid-Open Publication No. 11-22789 is configured of a two-stage planetary gear mechanism. The final (second) stage planetary gears of the planetary gear mechanism comprise a carrier including three thick ribs which are fixed to a housing (case) coupled to a motor via bolts at portions in a circumferential direction at regular intervals. Three planetary gears driveably engaged with inner gear teeth formed inside of the ring gear are rotatably supported by the carrier at portions in the circumferential direction at regular intervals. Further, a reduction planetary gear disclosed in the Japanese Utility-Model Laid-Open Publication No. 5-42812 is configured of a three-stage planetary gear mechanism, in which the final (third) stage planetary gears engaged with the ring gear are configured such that four thereof are disposed in the circumferential direction at regular intervals.

Herein, however, the reduction planetary gear disclosed in the Japanese Patent Laid-Open Publication No. 11-22789 has a problem that the contact face pressure and the bending stress which occur to gear teeth of the planetary gears may become too large because the number of the final planetary gears which are engaged with the inner gear teeth of the ring gear is just three, which may be a so small number. Herein, it may be considered to make a tooth width of the planetary gears and the inner gear teeth wider enough to maintain a sufficient strength. However, that may cause another problem that the entire length of the reduction planetary gear becomes improperly long, which should be inappropriate in terms of a layout-space utility of the reduction planetary gear. Meanwhile, the reduction planetary gear with four planetary gears of the final stage one disclosed in the Japanese Utility-Model Laid-Open Publication No. 5-42812 could solve the above-described problem, but may cause other problems that it has, for example, too many parts number and an improper complexity in structure of the reduction planetary gear.

Thus, it is needed to provide the reduction planetary gear which can reduce the contact face pressure and the bending stress occurring to gear teeth of the ring gear and the planetary gears, maintain properly a sufficient strength of planetary gears driveably engaged with the ring gear, and simplify the structure thereof.

Further, it is also needed to provide the reduction planetary gear which can reduce the contact face pressure and the bending stress occurring to inner gear teeth of the ring gear, maintain properly a sufficient strength of the inner gear teeth of the ring gear, avoid any improper treatments for hardening the inner gear teeth of the ring gear, and reduce any limitations in work loads for manufacturing and in designing structures.

SUMMARY OF THE INVENTION

The present invention has been devised in view of the above-mentioned problems.

It is an object of the present invention to provide a gear mechanism which can reduce the contact face pressure and the bending stress occurring to inner and outer gear teeth, improve the limitation of the durability of the gear mechanism due to the large difference of durability between the inner and outer gear teeth, and lessen the necessity of increasing hardness of the inner gear teeth.

It is another object of the present invention to provide a reduction planetary gear which can reduce the contact face pressure and the bending stress occurring to gear teeth of a ring gear and planetary gears, maintain properly a sufficient strength of the planetary gears driveably engaged with the ring gear, and simplify a structure thereof.

It is further another object of the present invention to provide a reduction planetary gear which can reduce the contact face pressure and the bending stress occurring to inner gear teeth of the ring gear, maintain properly a sufficient strength of the inner gear teeth of the ring gear, avoid any improper treatments for hardening the inner gear teeth of the ring gear, and reduce any limitations in work loads for manufacturing and in designing structures.

The above-described objects can be solved according to the present invention by a gear mechanism and a reduction planetary gear. Preferred embodiments of the present invention are subject of the dependent claims.

According to the present invention, there is provided a gear mechanism, comprising inner gear teeth formed at a first gear element, and outer gear teeth formed at a second gear element and engaged with said inner gear teeth, wherein the inner and outer gear teeth are formed of high-tooth, and an engagement ratio of the inner and outer gear teeth is configured so as to be 2.0 or more, whereby a load can be transferred between the inner and outer teeth via a continuous gear engagement of at least two pairs of gear teeth thereof.

Accordingly, since the load applied to the inner and outer gear teeth are continuously dispersed into two or more gear teeth securely, the contact face pressure and the bending stress occurring to the inner and outer gear teeth can be reduced, and the difference of durability between the inner and outer gear teeth can be prevented from becoming large, thereby improving the limitation of the durability of the gear mechanism. Further, because of the reduction of the contact face pressure and the bending stress, the necessity of increasing hardness of the inner gear teeth can be lessened.

According to a preferred embodiment of the gear mechanism of the present invention, a tooth thickness of a gear tooth end of at least one of the inner and outer gear teeth is configured so as to be thinner than that of an involute tooth, whereby the load transfer via the two pairs of gear teeth of the inner and outer gear teeth is not interfered with an engagement of a third pair of gear teeth even in the event that the third pair of gear teeth are engaged along with the engagement of the two pairs of gear teeth for the load transfer.

Accordingly, the load can be efficiently transferred between the inner and outer gear teeth.

Further, according to the present invention, there is provided a reduction planetary gear comprising an input shaft driveably connected to an output shaft of a motor, a sun gear driveably connected to said input shaft, a planetary gear mechanism including one or more stages of planetary gears which are driveably engaged with the sun gear, a ring gear including inner gear teeth which are formed inside thereof and driveably engaged with planetary gears of the planetary gear mechanism including one stage of planetary gears or final planetary gears of the planetary gear mechanism including plural stages of planetary gears, a case rotatably supporting said ring gear, wherein gear teeth of the planetary gears and the inner gear teeth of the ring gear driveably engaged with planetary gears are formed of high-tooth, and an engagement ratio of the gear teeth of the planetary gears and the inner gear teeth of the ring gear is configured so as to be 2.0 or more.

Accordingly, since the load (force) applied to the gear teeth of the planetary gears and the ring gear are continuously dispersed into two or more gear teeth securely, the contact face pressure and the bending stress occurring to the gear teeth can be reduced. Further, maintaining of strength of the planetary gears engaged with the ring gear can be achieved properly, and the reduction planetary gear can be prevented from becoming improperly longer and be simplified in structure.

According to a preferred embodiment of the reduction planetary gear of the present invention, the sun gear, which is driveably engaged with the planetary gears of the planetary gear mechanism including one stage of planetary gears or final planetary gears of the planetary gear mechanism including plural stages of planetary gears, is configured such that a gear tooth base thereof is formed of high-tooth, while a gear tooth end thereof is formed of full depth tooth.

Accordingly, the gear tooth base of the sun gear can be strengthened and a tooth thickness of the gear tooth end thereof can be made sufficiently thick, thereby avoiding any damage or breakage of the gear tooth end.

According to another preferred embodiment of the reduction planetary gear of the present invention, gear teeth of other planetary gears than the final planetary gears of the planetary gear mechanism including plural stages of planetary gears are formed of full depth tooth.

Accordingly, since a lubricating oil comes to be apt to leak easily out of a space between the gear tooth end and the gear tooth base, a rotational resistance of the gears which may be caused by an oil trap in the above-described space during the gear-tooth engagement can be reduced. Also, since a slip ratio of gear teeth is prevented properly from being excess which may be caused by the gear teeth being formed of high-tooth, a sliding resistance of the gear teeth can also reduced, thereby improving an efficiency of the reduction planetary gear compared to the planetary gears which are formed of high-tooth.

According to another preferred embodiment of the reduction planetary gear of the present invention, the planetary gear driveably engaged with the ring gear are configured such that three thereof are disposed in a circumferential direction.

Accordingly, since the gear teeth of the planetary gears and the inner gear teeth driveably engaged with planetary gears are formed of high-tooth with the 2.0 or more engagement ratio of gear teeth, the contact face pressure and the bending stress occurring to the gear teeth can be reduced. Thus, even though there are provided three planetary gears engaged with the ring gear, maintaining of the sufficient strength can be achieved properly, the number of parts can be reduced, and the tooth width can be prevented from becoming improperly large.

According to another preferred embodiment of the reduction planetary gear of the present invention, a hardening treatment is applied to a surface of said ring gear.

Accordingly, maintaining of the sufficient strength can be achieved properly, and the tooth width can be shortened.

Further, according to the present invention, there is provided a reduction planetary gear comprising an input shaft driveably connected to an output shaft of a motor, a sun gear driveably connected to the input shaft, a planetary gear mechanism including one or more stages of planetary gears which are driveably engaged with the sun gear, a ring gear including inner gear teeth which are formed inside thereof and driveably engaged with planetary gears of the planetary gear mechanism including one stage of planetary gears or plural stages of planetary gears, a case rotatably supporting the ring gear, wherein inner gear teeth of the ring gear and gear teeth of the planetary gears driveably engaged with the ring gear are formed of high-tooth, an engagement ratio of the inner gear teeth of the ring gear and the gear teeth of the planetary gears is configured so as to be 2.0 or more, and the inner gear teeth of the ring gear are made of casting.

Accordingly, since the load (force) applied to the inner gear teeth of the ring gear are continuously dispersed into two or more gear teeth securely, the contact face pressure and the bending stress occurring to the gear teeth can be reduced. Further, maintaining of strength of the inner gear teeth of the ring gear can be achieved properly, any improper treatments for hardening the inner gear teeth of the ring gear can be omitted, and the ring gear can be manufactured by casting easily. Thereby, any limitations in work loads for manufacturing and in designing structures for the reduction planetary gear can be reduced properly.

According to a preferred embodiment of the reduction planetary gear of the present invention, two of first stage planetary gears of the planetary gear mechanism including the plural stages of planetary gears, which are engaged with the sun gear, are disposed at substantially opposite sides to each other, putting the sun gear therebetween, and gear teeth of the first stage of planetary gears are formed of high-tooth.

Accordingly, even though the first sage planetary gears are configured of two planetary gears disposed at substantially opposite sides, the contact face pressure and the bending stress occurring to respective gear teeth can be reduced by forming the gear teeth of high-tooth. Thus, the number of planetary gears can be reduced, and the contact face pressure and the bending stress occurring to the inner gear teeth of the ring gear can be reduced by the engagement with the first stage planetary gears. As a result, maintaining of a sufficient strength of the inner gear teeth of the ring gear can be achieved properly, and any improper treatments for hardening the inner gear teeth can be omitted.

According to another preferred embodiment of the reduction planetary gear of the present invention, the inner gear teeth of the ring gear and a supporting portion which holds the inner gear teeth and is rotatably supported at the case are formed integrally with each other and made of casting.

Accordingly, since the maintaining of a sufficient strength of the inner gear teeth of the ring gear can be achieved properly without applying any improper hardening treatments, the ring gear and the supporting portion can be formed integrally with each other and made of casting. Thus, an omission of any improper hardening treatments and a reduction of the number of parts can be obtained.

Other features, aspects and advantages of the present invention will become apparent from the following description of the present invention which referrers to the accompanying drawings.

DETAILED DESCRIPTION OF THE INVENTION

Hereinafter, preferred embodiments of the present invention will be described referring to the accompanying drawings. It should be understood that even though embodiments are separately described, single features thereof may be combined to additional embodiments.

Embodiment 1

Figure 1:
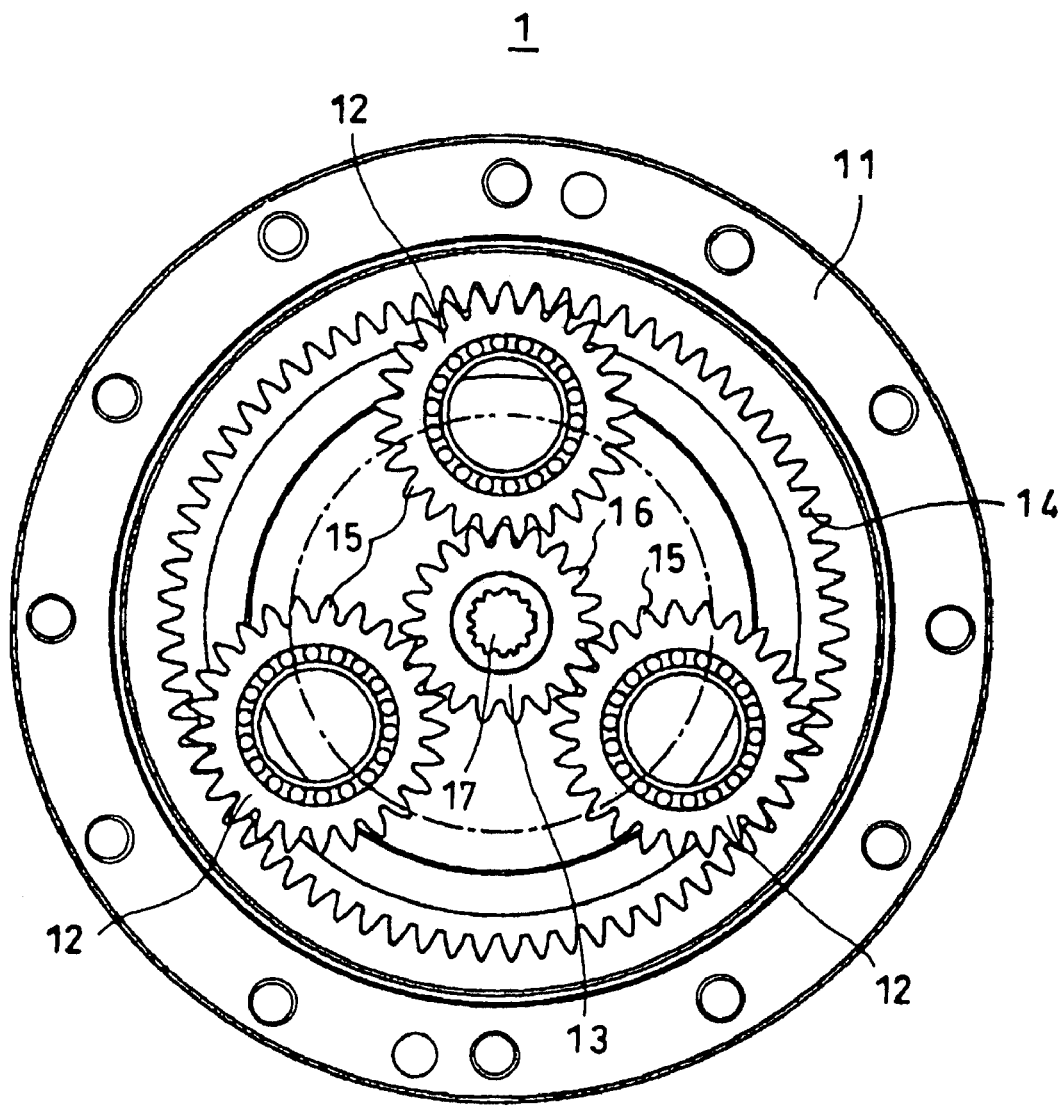
FIG. 1 is a diagram showing an engagement state of inner and outer gear teeth of an exemplified gear mechanism according to a first embodiment of the present invention.

FIG. 1 shows an engagement state of inner and outer gear teeth of an exemplified gear mechanism according to a preferred embodiment of the present invention. As shown in FIG. 1, the gear mechanism 1 is configured as a planetary gear which comprises a ring gear 11 as a first gear element, planetary gears 12 as a second gear element, a sun gear 13 and the like.

The ring gear 11 includes inner gear teeth 14 formed inside thereof, which are engaged with respective planetary gears 12 to transfer a load therebetween. Three planetary gears 12 are disposed in a circumferential direction at regular intervals, which are rotatably supported on support portions (not illustrated) respectively. The planetary gears 12 include outer gear teeth 15 formed outside thereof respectively, which are engaged with the inner gear teeth 14 of the ring gear 11. The gear mechanism 1 comprises the inner gear teeth 14 formed at the ring gear 11 and the outer gear teeth 15 formed at the planetary gears 12 in this way.

Further, the sun gear 13 includes outer gear teeth 16 which are engaged with the outer gear teeth 15 of the planetary gears 12, and an axis 17 is disposed so as to penetrate at a center of the sun gear 13 and be rotatably supported, so that the sun gear 13 is rotatably supported independently from the axis 11. Herein, the gear mechanism 1 of FIG. 1 is configured of multi-stage planetary gears, and the illustrated planetary gear constitutes final stage planetary gears.

For example, the above-described gear mechanism 1 is used for a reduction gear; In this case, a rotational driving force conveyed from the axis 17 is transferred to first stage planetary gears (not illustrated), and then, via one or more stages of planetary gears, to the sun gear with a speed reduction. The rotation of the sun gear 13 causes a rotation of the planetary gears 12 supported on non-illustrated support portions, and thereby the ring gear 11 is driven via an engagement of the outer gear teeth 15 and the inner gear teeth 14.

Further, for example, the gear mechanism 1 may be used for a multiplying gear, by interconnecting the axis 17 and the sun gear 13 so as to rotate together. In this case, the rotation from the axis 17 is transferred to the ring gear 11, and the planetary gears 12 are rotated via the engagement of the outer gear teeth 15 and the inner gear teeth 14. The rotation of the planetary gears 12 drives the sun gear 13 with speed multiplying, and the axis 17 is rotated by the rotation of the sun gear.

Figure 2:
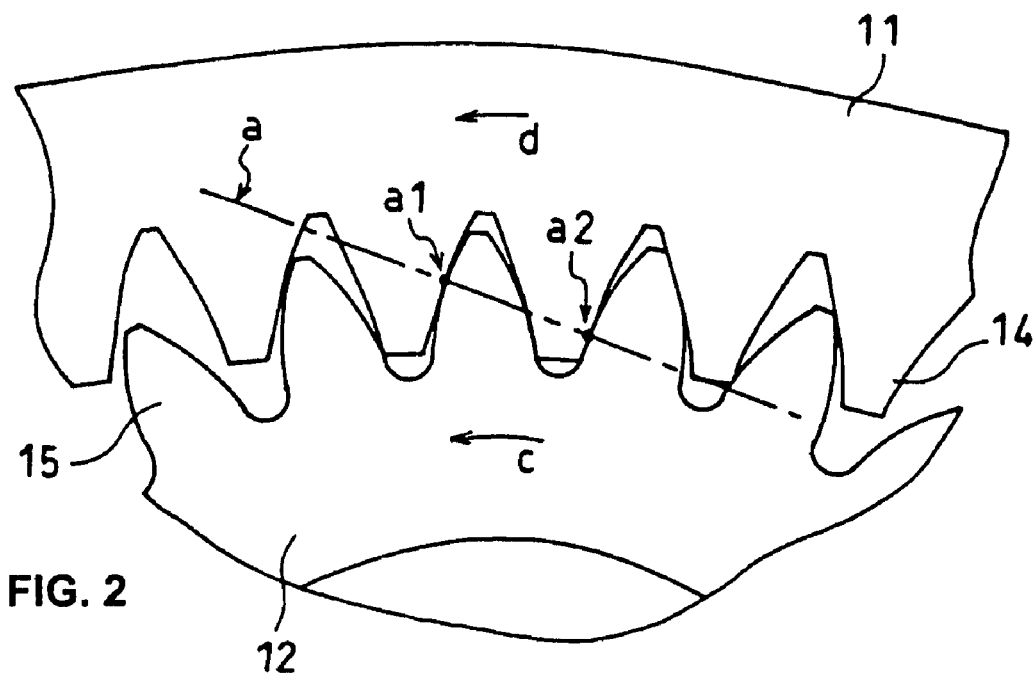
FIG. 2 is an enlarged diagram showing an engagement state of inner gear teeth of a ring gear and outer gear teeth of a planetary gear of the gear mechanism of FIG. 1.
Figure 3:
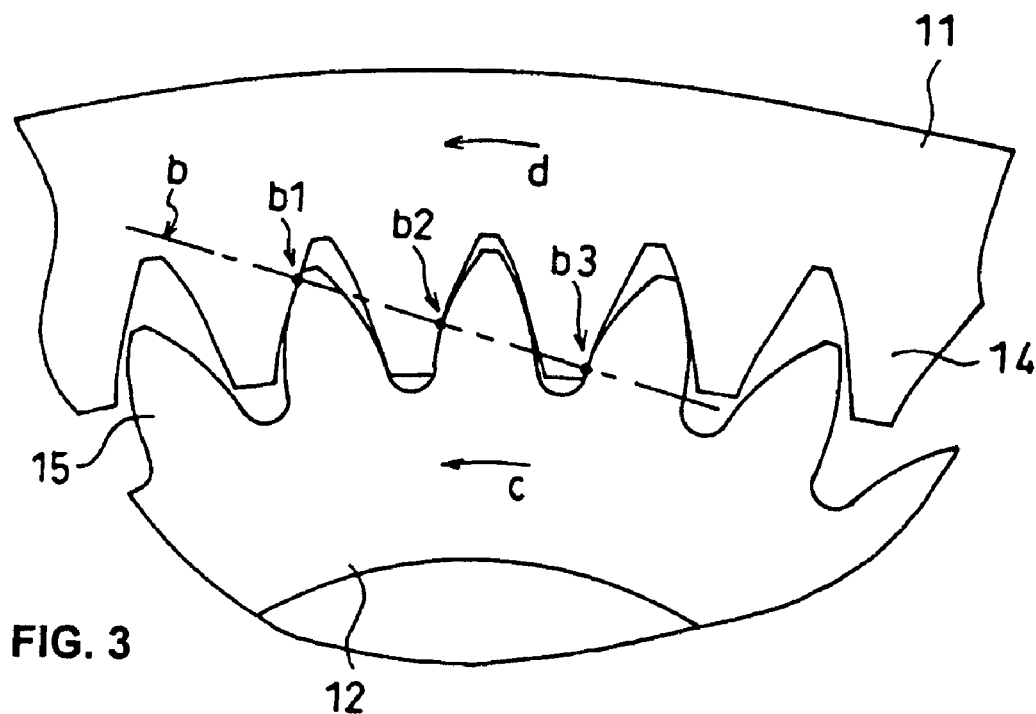
FIG. 3 is an enlarged diagram showing another engagement state of the inner gear teeth of the ring gear and the outer gear teeth of the planetary gear of the gear mechanism of FIG. 1.

Hereinafter, a constitution of the inner gear teeth 14 and the outer gear teeth 15 is described in detail. FIGS. 2 and 3 are enlarged diagrams showing states of the engagement of the inner gear teeth 14 of the ring gear 11 and the outer gear teeth 15 of the planetary gears 12. As shown in FIGS. 2 and 3, the inner gear teeth 14 and the outer gear teeth 15 are formed of high-tooth, not of full depth tooth. An engagement ratio ($\epsilon$) of the inner gear teeth 14 and the outer gear teeth 15 is configured so as to be 2.0 or more.

FIGS. 2 and 3 illustrate different states of the engagement of gear teeth from each other (i.e., sates in which contact positions of the inner teeth 14 and the outer teeth 15 are different from each other), in which respective lines of action (a and b) for the load transfer are illustrated by one-dotted broken lines respectively. Herein, the gear shown in FIGS. 2 and 3 is the reduction gear, in which the planetary gear 12 rotates in a direction shown by an arrow c and thereby the ring gear 11 is driven in a direction shown by an arrow d.

In the state shown in FIG. 2, the inner gear teeth 14 are engaged with the outer gear teeth 15 via two pair of teeth thereof to transfer the load. Namely, the load transfer is executed at the two engagement points a1 and a2 on the line of action a in directions perpendicular to respective gear tooth faces. Meanwhile, in the state shown in FIG. 3, the inner gear teeth 14 are engaged with the outer gear teeth 15 via three pair of teeth thereof to transfer the load, in which there are three engagement points b1, b2 and b3 on the line of action b for the load transfer. Accordingly, the inner gear teeth 14 and the outer gear teeth 15 have the sate in which the load transfer is executed by the engagement of two pair of teeth and the state in which the sate in which the load transfer is done by the engagement of three pair of teeth, and thereby the engagement ration is 2.5 ($\epsilon=2.5$).

Accordingly, since the inner gear teeth 14 and the outer gear teeth 15 are formed of high-tooth and the load can be transferred therebetween via a continuous gear engagement of at least two pairs of gear teeth thereof, the load can be continuously dispersed into two or more gear teeth securely. Thus, the contact face pressure and the bending stress occurring to the inner gear teeth 14 and the outer gear teeth 15 can be reduced appropriately, and the difference of durability between the inner gear teeth 14 and the outer gear teeth 15 can be prevented from becoming large.

Figure 4A:
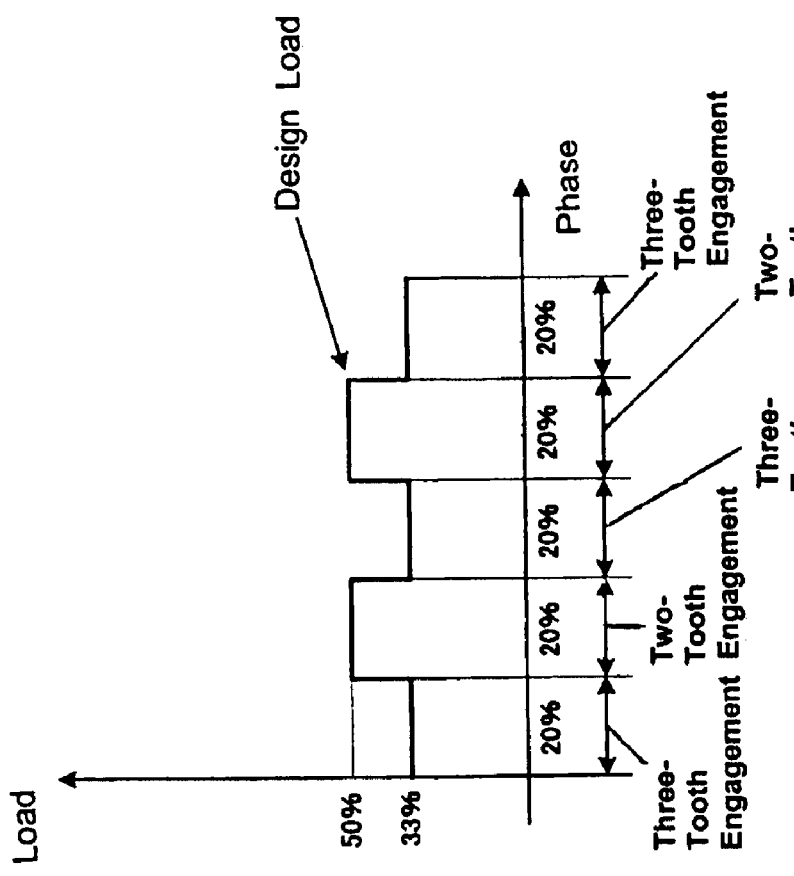
FIGS. 4A and 4B are explanatory diagrams showing load changes occurring to a pair of gear teeth during a gear tooth engagement.
Figure 4B:
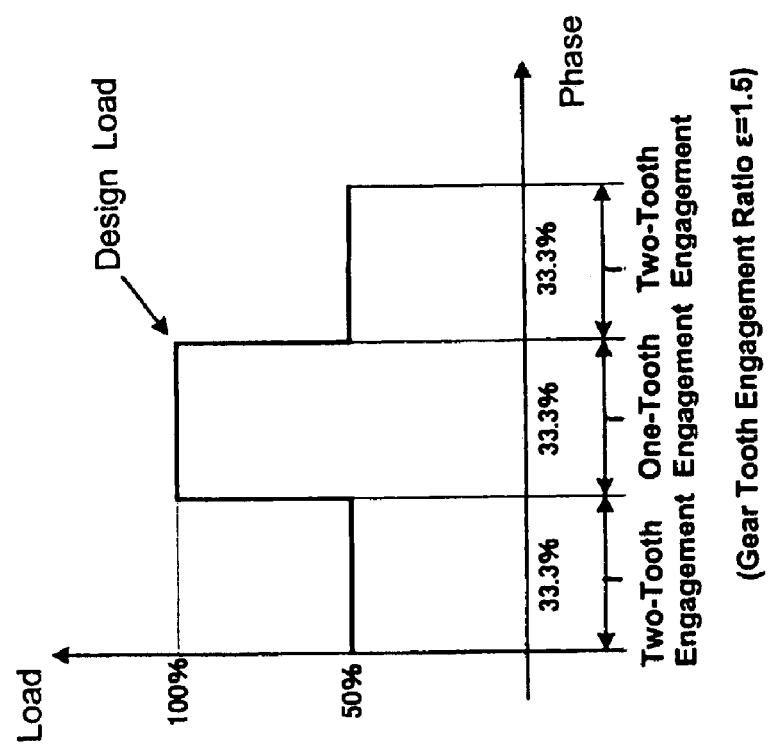

FIGS. 4A and 4B are explanatory diagrams showing load changes occurring to a pair of gear teeth (load changes acting in the direction perpendicular to gear tooth faces) during the gear tooth engagement of the inner gear teeth 14 and the outer gear teeth 15 which are formed of high-tooth. Herein, FIG. 4A shows the one for the gear mechanism with the gear tooth engagement ratio $\epsilon=1.5$, while FIG. 4B shows the one for the gear mechanism with the gear tooth engagement ratio $\epsilon=2.5$. In the gear mechanism with the engagement ratio $\epsilon=1.5$, the gear tooth engagement via a pair of gear teeth accounts for 66% of the entire engagement phase, while the gear tooth engagement via two pairs of gear teeth accounts for 34% (17%×2) of the entire engagement phase. In this case, since the gear tooth engagement ratio is less than 2.0 and thereby there exists a sate in which the gear teeth are engaged with each other only via a pair of gear teeth, a maximum value of the transferred load (i.e., a design load as a standard for calculating a gear strength) becomes large. As a result, extremely large contact face pressure and bending stress might occur to the inner and outer gear teeth.

Meanwhile, in the gear mechanism with the gear tooth engagement ratio $\epsilon=2.5$, the gear tooth engagement via two pairs of gear teeth accounts for 60% of the entire engagement phase, while the gear tooth engagement via three pairs of gear teeth accounts for 40% (20%×2) of the entire engagement phase. Herein, the load is transferred at least via two pairs of gear teeth. Accordingly, the maximum value of the transferred load can be reduced greatly, and the maximum transferred load (i.e., design load) acting in the direction perpendicular to the tooth face can be reduced by half, compared to the case in which there exists a sate in which the gear teeth are engaged with each other only via a pair of gear teeth.

Figure 5:
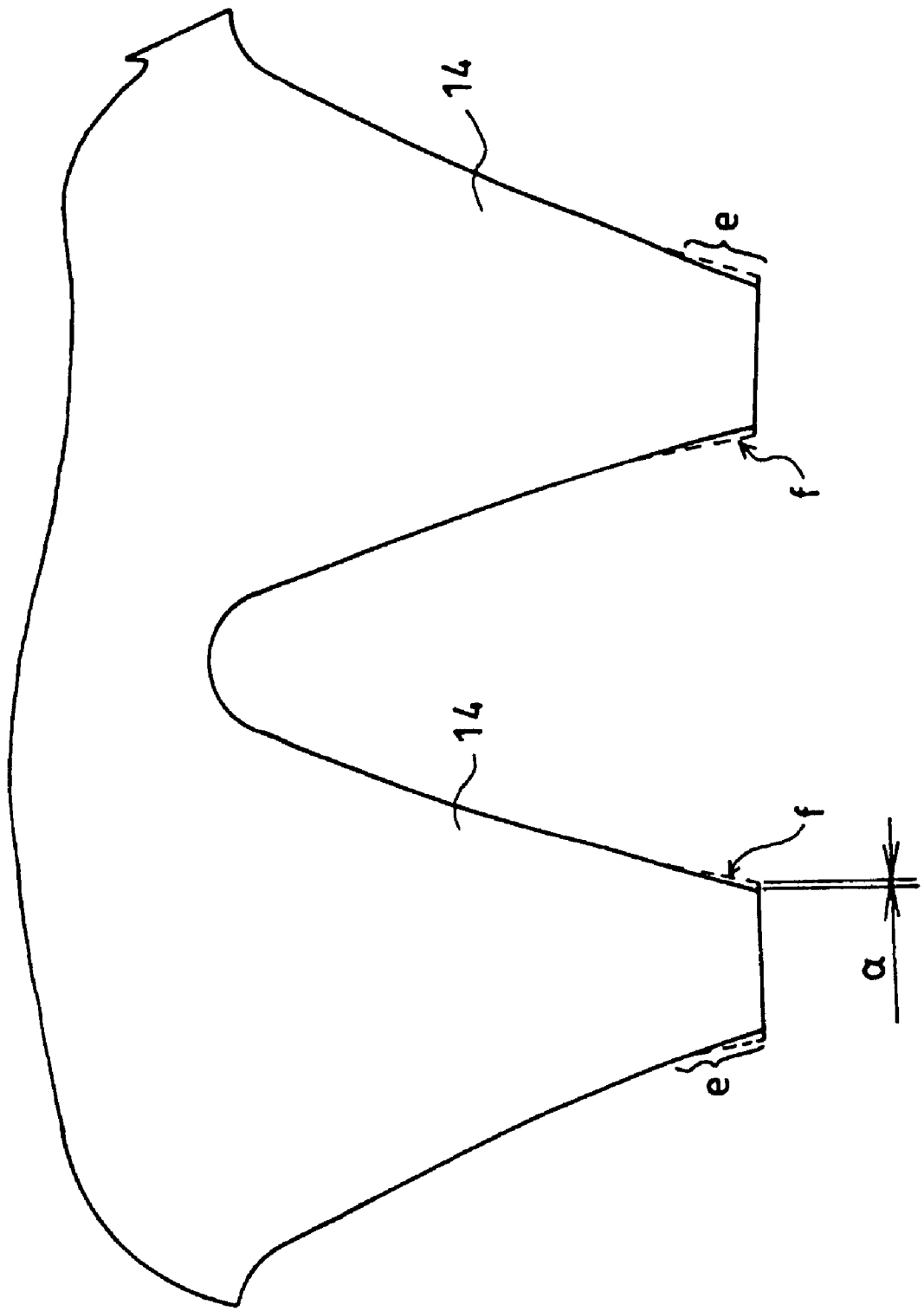
FIG. 5 is a partially enlarged diagram of the inner gear teeth of the gear mechanism of FIG. 1.

FIG. 5 is a partially enlarged diagram of the inner gear teeth 14. As shown in this figure, a tooth thickness of a gear tooth end portion e of the inner gear teeth 14 is configured so as to be thinner by $\alpha$ than that of an involute tooth (denoted by f).

In the gear mechanism 1, since the tooth thickness of the gear tooth end of the inner gear teeth 14 is configured so as to be thinner than that of the involute tooth, the load transfer via the two pairs of gear teeth is not interfered with the engagement of a third pair of gear teeth even in the event that the third pair of gear teeth are engaged along with the engagement of the two pairs of gear teeth for the load transfer. Accordingly, the load can be efficiently transferred between the inner gear teeth 14 and the outer gear teeth 15. Also, the magnitude of transferred load which may be required due to the above-described interference can be prevented from increasing, thereby reducing the design load properly. Also, the prevention of interference can be accomplished by such a simple structure as just making the tooth thickness thinner as described above.

As described above, according to the gear mechanism 1, the contact face pressure and the bending stress occurring to the inner and outer gear teeth can be reduced greatly, and the difference of durability between the inner and outer gear teeth can be prevented properly from becoming large, thereby improving the limitation of the durability of the gear mechanism.

Further, according to the above-described gear mechanism 1, because of the reduction of the contact face pressure and the bending stress, the necessity of increasing hardness of the inner gear teeth 14 can be lessened. Accordingly, any particular treatments for the inner gear teeth, such as hardening, may not be necessary in order to maintain the enough hardness thereof. Also, such non-necessity of particular treatments could eliminate a strain problem caused by heat treatments and make it easy to maintain an accurate designing of the inner gear teeth.

Also, in the case where the gear mechanism 1 with the inner and outer gear teeth formed of high-tooth and with its gear tooth engagement of 2.0 or more is used for the multiplying gear, since the contact face pressure and the bending stress occurring to the inner and outer gear teeth is reduced greatly, the amount of elastic deformation of the inner and outer gear teeth in the circumferential direction can also be reduced during their engagement. Accordingly, a gear noise occurring especially during a high-speed rotation can also be prevented properly.

Herein, any other modifications or improvements can be applied to the gear mechanism within a scope of the claimed invention as follows.

(1) The gear mechanism with the inner and outer gear teeth may be used for a reduction planetary gear, a multiplying planetary gear, a turning device for the construction machine, and the like.

(2) The gear mechanism may be applied to other stage planetary gears than the final stage planetary gears. Also, the gear mechanism may be applied to planetary gears with one stage thereof. The gear mechanism may also be applied to other gear mechanisms than the planetary gears.

(3) The tooth thickness of the gear tooth end of the outer gear teeth, instead of or in addition to the inner gear teeth, may be configured so as to be thinner than that of the involute tooth.

Embodiment 2

Figure 6:
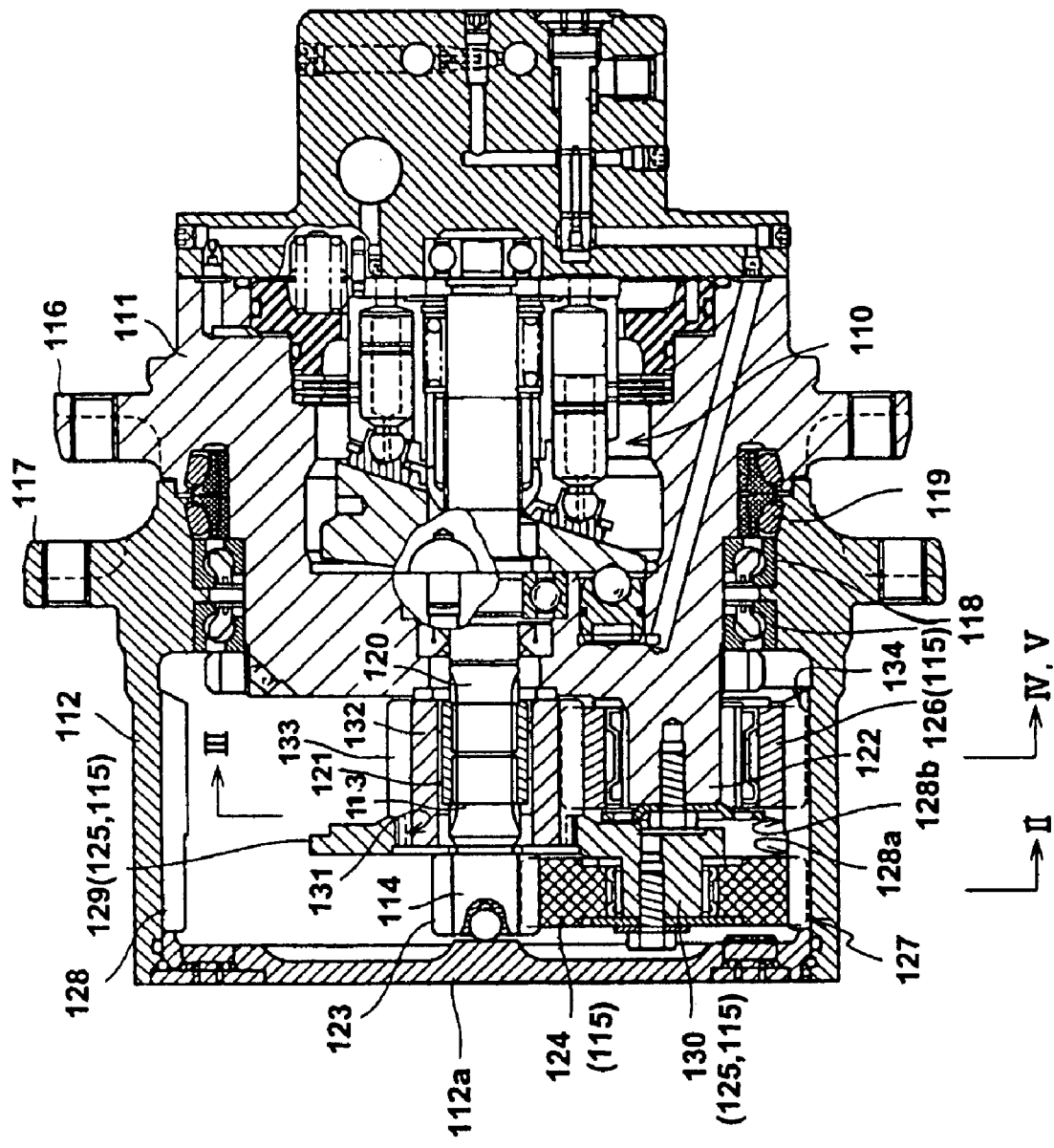
FIG. 6 is a sectional view showing a reduction planetary gear according to a second embodiment of the present invention.

FIG. 6 is a sectional view showing an exemplified reduction planetary gear 101 according to a second embodiment of the present invention. As shown in FIG. 6, the reduction planetary gear 101 includes a case 111, which is fixed to a frame or the like (not illustrated) via a flange portion 116. The reduction planetary gear 101 transfers a rotational driving force, which is generated by a hydraulic motor 110 which comprises plural pistons and is located inside the case 111, with a speed reduction, and eventually drives a ring gear 112 which is rotatably supported on the case 111. Accordingly, a driven member (not illustrated) is driven via a sprocket (not illustrated) which is attached to a flange portion 117 provided at the ring gear 112.

The reduction planetary gear 101 comprises the case 111, the ring gear 112, an input shaft 113, a sun gear 114, a planetary gear mechanism 115 and the like.

The case 111, which is fixed to the flame or the like, accommodates the hydraulic motor 110 in it, and rotatably supports the ring gear 112 via a bearing 118. The bearing 118 is provided at a circumferential portion of one end (at a left end in the figure) of the case 111. At a circumferential portion of the case 111 between the bearing 118 and the flange portion 116 is provided a seal portion 119, which provides sealing between the case 111 and the other end (at a right end in the figure) of the ring gear 112. Further, an output shaft 120 of the hydraulic motor 110 is rotatably supported at the case 111 so as to extend outside from the one end of case 111. Also, there are provided three boss portions 122, which protrude from the one end of the case 111, in the circumferential direction at regular intervals. Three planetary gears 126, which are final planetary gears of the planetary gear mechanism 115, are rotatably supported on the boss portions 122 respectively.

The ring gear 112 is of a hollow cylindrical shape and, as described above, rotatably attached at the one side of the case 111 to drive the sprocket and the like, not illustrated. At one end of the ring gear 112 is attached a cover member 112a, and the planetary gear mechanism 115 is accommodated in the ring gear 112. There are provided inner gear teeth 128 which are formed at an inner periphery of the ring gear 112 and engaged with first stage planetary gears 124 and final stage planetary gears 126 of the planetary gear mechanism 115. The inner gear teeth 128 are configured such that a portion 128a engaged with the planetary gears 124 (at a side of the one end) is formed of full depth tooth, while a portion 128b engaged with the planetary gears 126 (at a side of the other end) is formed of high-tooth.

The input shaft 113 is driveably coupled to the output shaft 120 of the hydraulic motor 110 via a spline joint 121. Accordingly, the input shaft 113 is rotated together with the output shaft 120. To one end of the input shaft 113 is coupled the sun gear 114 so that the sun gear 114 can rotate with the input shaft 113. Outer peripheral gear teeth 123 are formed at the sun gear 114 so as to be engaged with the first stage planetary gears 124 of the planetary gear mechanism to drive.

The planetary gear mechanism 115 is comprised of two-stage planetary gears which are driven along with the sun gear 114. Namely, it includes the first planetary gears 124, a carrier 125 as a supporting frame (planetary frame), and the second (final) stage planetary gears 126.

The first stage planetary gears 124 are configured such that three thereof are disposed in the circumferential direction, and respective planetary gears 124 are rotatably supported on the carrier 125. Outer peripheral gear teeth 127 formed at the planetary gears 124 are engaged with the outer peripheral gear teeth 123 of the sun gear 114 to rotate along with the sun gear 114. Also, the outer peripheral gear teeth 127 of the planetary gears 124 are engaged with the inner gear teeth 128 of the ring gear 112. Thus, according to a rotation of the sun gear 114, the planetary gears 124 move along the inner periphery of the ring gear 112, rotating around their own axes.

Figure 7:
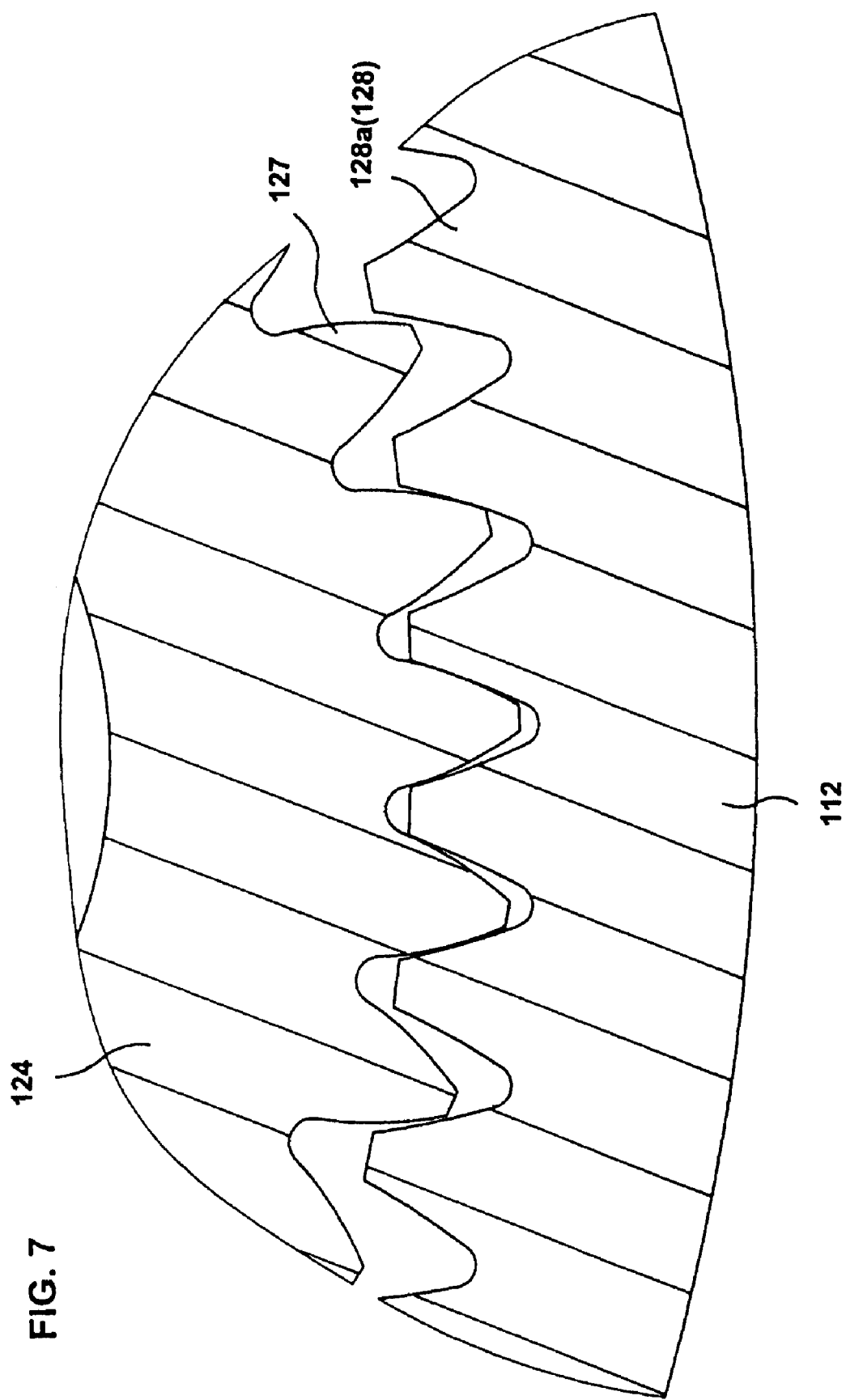
FIG. 7 is a partially enlarged sectional view of the reduction planetary gear taken on line II of FIG. 6, showing an engagement state of a planetary gear and a ring gear.

Further, FIG. 7 is a partially enlarged sectional view of the reduction planetary gear taken on line II of FIG. 6, showing an engagement state of the planetary gear 124 and the ring gear 112. As shown in FIGS. 6 and 7, the outer peripheral gear teeth 127 of the Planetary gears 124 are engaged with the full depth tooth portion 128a of the inner gear teeth 128 of the ring gear 112, and the outer peripheral gear teeth 127 are formed of full depth tooth.

The carrier 125 includes a doughnut-shaped flat plate portion 129 and three axial portions 130 which protrude from the flat plate portion 129 in the circumferential direction at regular intervals. On the axial portions 130 are rotatably supported the planetary gears 124. Accordingly, the planetary gears 124 driven by the sun gear 114 move around the sun gear 114, rotating around the axial portion 130, and thereby the carrier 125 also rotates around the sun gear 114.

Also, inner peripheral gear teeth 131 are formed at an inner periphery of the flat plate portion 129 of the carrier 125 so as to be engaged with a second sun gear 132. The second sun gear 132 receives the input shaft 113 and the output shaft 120 therein so as to be rotatably supported with respect to the input and output shafts (113, 120). At the sun gear 132 are formed outer peripheral gear teeth 133 which are engaged with the inner peripheral gear teeth 131 of the carrier 125. Thus, the second sun gear 132 is driven according to the rotation of the carrier 125.

Figure 8:
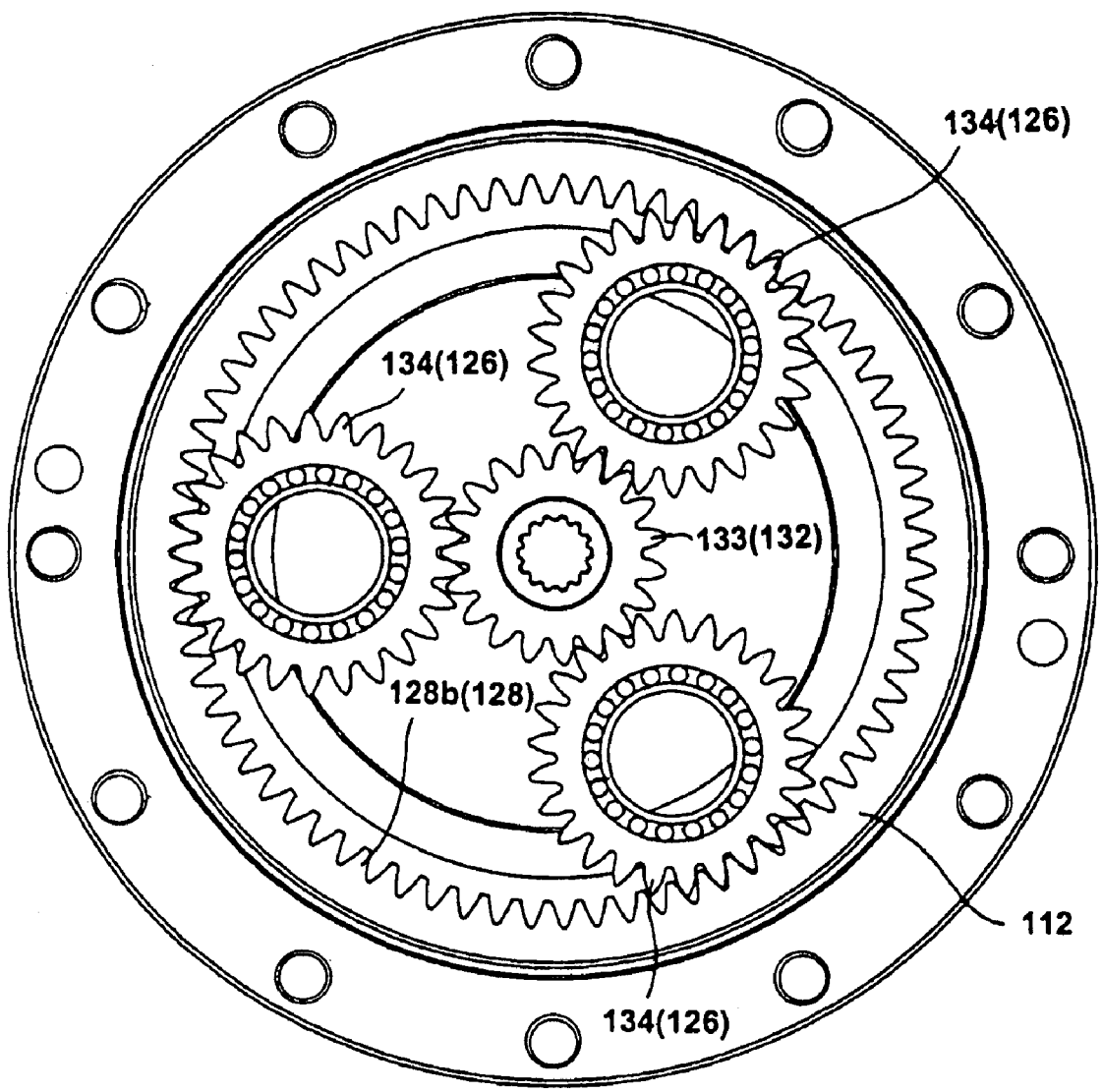
FIG. 8 is a view showing the ring gear, planetary gears and a second sun gear, seen from line III of FIG. 6.

The final stage planetary gears 126 are rotatably supported on the boss portions 122 protruding from the case 111. FIG. 8 is a view showing the ring gear 112, the planetary gears 126 and the second sun gear 132, seen from line III of FIG. 6. As shown in FIGS. 6 and 8, the three planetary gears 126 are disposed in the circumferential direction at regular intervals. At the planetary gears 126 are formed outer peripheral gear teeth 134, which are engaged with the outer peripheral gear teeth 133 of the second sun gear 132 and the inner gear teeth 128 of the ring gear 112. Thus, as the second sun gear 132 rotates, the planetary gears 126 rotate around the boss portions 122 (without moving around the sun gear), and thereby the ring gear 112 is rotated by the rotation of the planetary gears 126.

Figure 9:
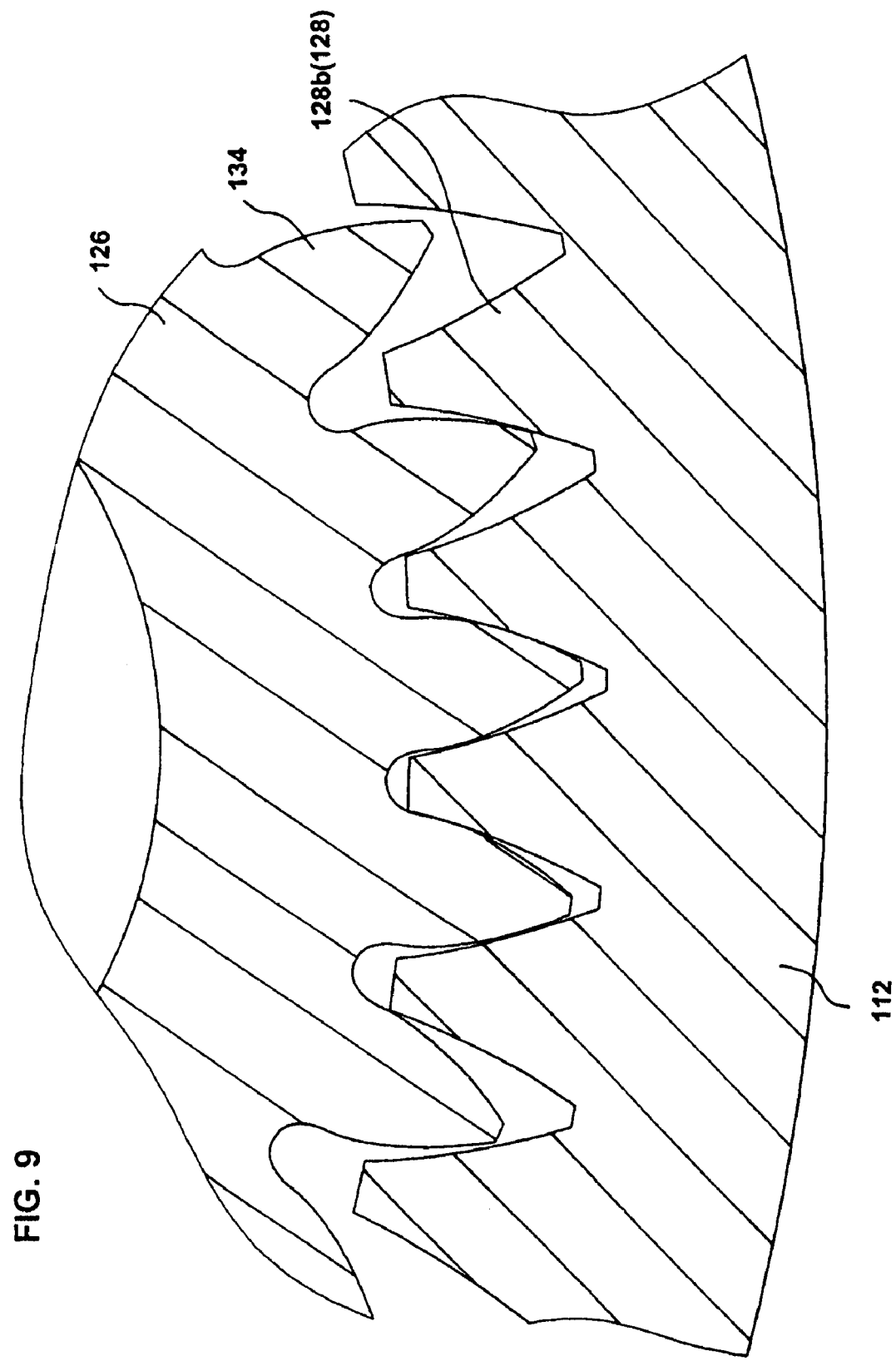
FIG. 9 is a partially enlarged sectional view of the reduction planetary gear taken on line IV of FIG. 6, showing an engagement state of the planetary gear and the ring gear.

FIG. 9 is a partially enlarged sectional view of the reduction planetary gear taken on line IV of FIG. 6, showing the engagement state of the planetary gear 126 and the ring gear 112. As shown in FIG. 9, the respective teeth 134 of the planetary gears 126 which are engaged with the ring gear 112 are formed of high-tooth, and these are engaged with the high-tooth portion 128b of the inner gear teeth 128 of the ring gear 112. Herein, the planetary gears 126 and the ring gear 112 are engaged continuously with each other via two or more pairs of gear teeth thereof, and thereby a state of gear tooth engagement ratio of 2.0 or more is maintained.

Accordingly, in the reduction planetary gear mechanism 115, since the gear teeth of the final planetary inner gears 126 engaged with the ring gear 112 are formed of high-tooth and the gear tooth engagement is configured so as to be 2.0 or more, the force (load) applied to the gear teeth 134 of the planetary gears 126 are continuously dispersed into two or more gear teeth. Thus, the contact face pressure and the bending stress occurring to the gear teeth 134 can be reduced. Also, even though there are provided three planetary gears 126, maintaining of the sufficient strength of the planetary gears 126 engaged with the ring gear 112 can be achieved properly, and the tooth width can be prevented from becoming improperly large.

Figure 10:
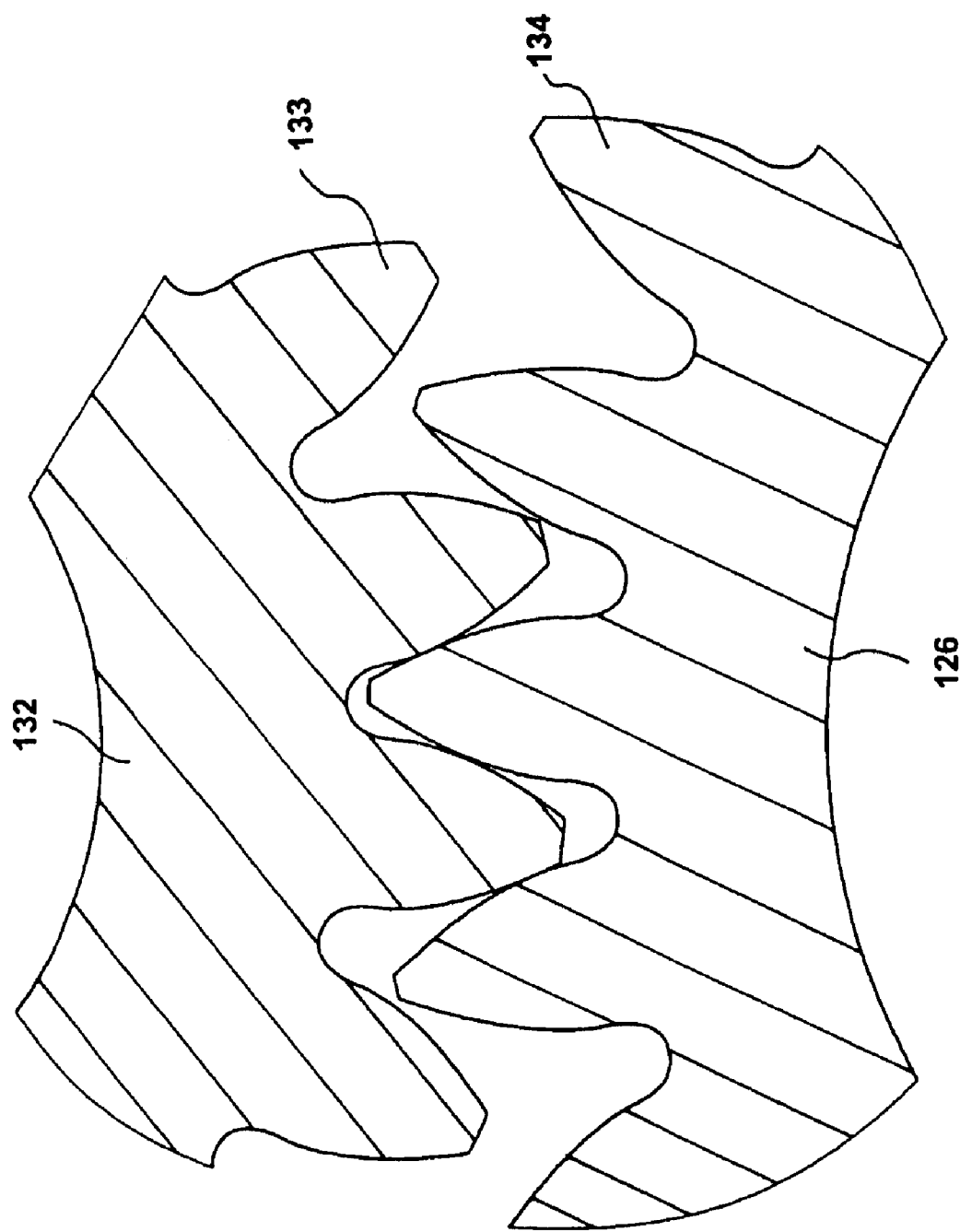
FIG. 10 is a partially enlarged sectional view of the reduction planetary gear taken on line V of FIG. 6, showing an engagement state of the planetary gear and the second sun gear.

FIG. 10 is a partially enlarged sectional view of the reduction planetary gear taken on line V of FIG. 6, showing the engagement state of the planetary gear 126 and the second sun gear 132. As shown in FIG. 10, although the outer peripheral teeth 134 of the planetary gears 126 are formed of high-tooth, the outer peripheral teeth 133 of the second sun gear 132 are configured such that their gear tooth base is formed of high-tooth and their gear tooth end is formed of full depth tooth. The number of gear teeth of the sun gear 132 and the planetary gears 126 is relatively small so that the gear tooth engagement thereof is less than 2.0, and thereby the load applied to the teeth of the sung gear 132 is relatively large. Also, it is necessary to lessen the number of the gear teeth of the sun gear 132 in order to increase the reduction ratio, and thus the sun gear 132 are engaged with other gears very often. For this reason, it is preferred that the gear tooth base of the sun gear is formed of high-tooth to increase hardness thereof such that the tooth thickness of the gear tooth base can be large. Meanwhile, if the gear tooth of the sun gear 132 is formed of high-tooth, the tooth thickness of the gear tooth end thereof becomes small. However, an enough tooth-thickness of the gear tooth end can be maintained by forming the gear tooth end of full depth tooth. Accordingly, the gear tooth base of the sun gear 132 can be strengthened and the tooth thickness of the gear tooth end thereof can be made sufficiently thick, thereby avoiding any damage or breakage of the gear tooth end.

Further, in the planetary gear mechanism 115, the gear teeth 127 of the first sage (other than the final stage) planetary gears 124 are formed of full depth tooth such that the contact face pressure can be relatively low compared to the second sun gear 132 as described above. Accordingly, since a lubricating oil comes to be apt to leak easily out of a space between the gear tooth end and the gear tooth base of the planetary gears 124 rotating fast, the rotational resistance of the gears which may be caused by an oil trap in the above-described space during the gear tooth engagement can be reduced (see FIG. 7). Also, since a slip ratio of gear teeth is prevented properly from being excess which may be caused by the gear teeth being formed of high-tooth, a sliding resistance of the gear teeth can also reduced, thereby improving an efficiency of the reduction planetary gear compared to the planetary gears which are formed of high-tooth.

As described above, the reduction planetary gear 101 according to the above embodiment can reduce the contact face pressure and the bending stress occurring to the gear teeth 134 of the planetary gears 126 driveably engaged with the ring gear 112, maintain properly the sufficient strength of the gear teeth, and simplify the structure of the planetary gear mechanism 115. Herein, any treatments, such as hardening, may be applied to the inner gear teeth 128 of the ring gear 112. In this case, maintaining sufficient strength of the inner gear teeth 128 may be facilitated, and the gear tooth width of the ring gear may be shortened. Herein, although the reduction planetary gear 101 including the two-stage planetary gears has been described, the same functions and effects as those of the above-described reduction planetary gear 101 may be obtained with regard to a reduction planetary gear including three or more stages of planetary gears in which the gear teeth of the final stage planetary gears driveably engaged with the ring gear are formed of high-tooth with the gear tooth engagement ratio thereof of 2.0 or more.

Herein, any other modifications or improvements can be applied to the reduction planetary gear within a scope of the claimed invention as follows.

(1) The planetary gear mechanism may be configured of one-stage planetary gears, in which planetary gears with one stage rotate only around their own axes and the ring gear is driven via its gear tooth engagement with the planetary gears. Herein, such a configuration that the gear teeth of the planetary gears are formed of high-tooth and the gear tooth engagement ratio is 2.0 or more can also reduce the contact face pressure and the bending stress occurring to the gear teeth of the planetary gears as well, thereby providing the same functions and effects as those of the above-described embodiment.

(2) For the planetary gear mechanism configured of one-stage planetary gears, the gear tooth end of the sun gear (coupled to the input shaft) driveably engaged with the planetary gears may be formed of high-tooth, and the gear tooth end thereof may be formed of full depth tooth. In this case, the same function and effects as those of the embodiment in which the gear tooth base of the second sun gear is formed of high-tooth and the gear tooth end thereof is formed of full depth tooth can be obtained.

Embodiment 3

Figure 11:
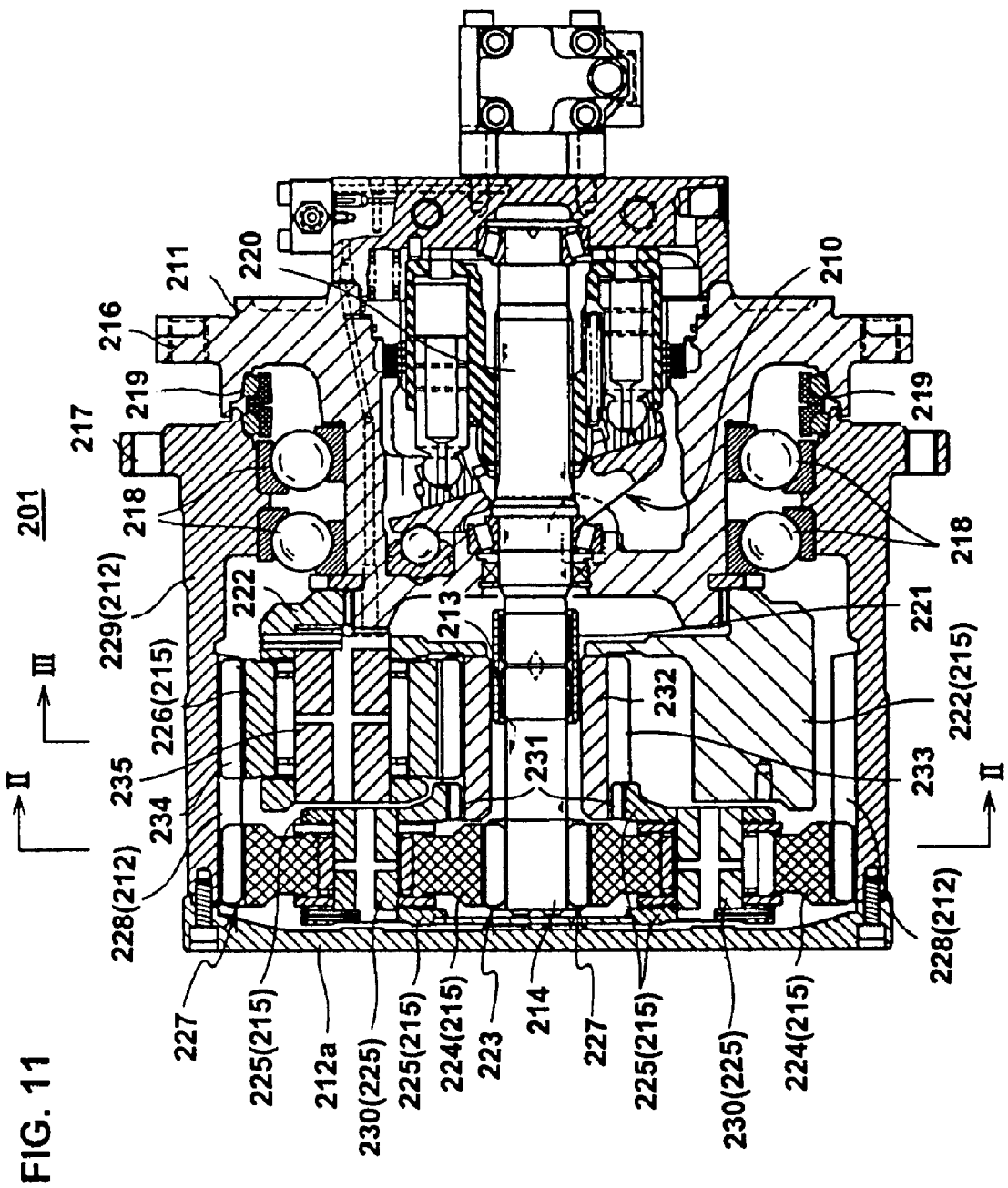
FIG. 11 is a sectional view showing another reduction planetary gear according to a third embodiment of the present invention.

FIG. 11 is a sectional view showing another exemplified reduction planetary gear 201 according to a third embodiment of the present invention. As shown in FIG. 11, the reduction planetary gear 201, which has substantially the same basic structure as the second embodiment described above, includes a case 211, which is fixed to a frame or the like (not illustrated) via a flange portion 216. The reduction planetary gear 201 transfers a rotational driving force, which is generated by a hydraulic motor 210 which comprises plural pistons and is located inside the case 211, with a speed reduction, and eventually drives a ring gear 212 which is rotatably supported on the case 211. Accordingly, a driven member (not illustrated) is driven via a sprocket (not illustrated) which is attached to a flange portion 217 provided at the ring gear 212.

The reduction planetary gear 201 comprises the case 211, the ring gear 212, an input shaft 213, a sun gear 214, a planetary gear mechanism 215 and the like.

The case 211, which is fixed to the flame or the like, accommodates the hydraulic motor 210 in it, and rotatably supports the ring gear 212 via a bearing 218. The bearing 218 is provided at a circumferential portion of one end (at the left in the figure) of the case 211. At a circumferential portion of the case 211 between the bearing 218 and the flange portion 216 is provided a seal portion 219, which provides sealing between the case 211 and the other end (at the right in the figure) of the ring gear 212. Further, an output shaft 220 of the hydraulic motor 210 is rotatably supported at the case 211 so as to extend outside from the one end of case 211. Also, at the one end of the case 211 is attached a holding portion 222 which is for the final stage planetary gears of the planetary gear mechanism 215, which will be described below.

The ring gear 212 is of a hollow cylindrical shape and, as described above, rotatably attached at the one side of the case 211 to drive the sprocket and, the like, not illustrated. At one end of the ring gear 212 is attached a cover member 212a, and the planetary gear mechanism 215 is accommodated in the ring gear 212. There are provided inner gear teeth 228 which are formed at an inner periphery of the ring gear 212 and engaged with first stage planetary gears 224 and final stage planetary gears 226 of the planetary gear mechanism 215. The inner gear teeth 228 are formed of not full depth tooth, but high-tooth. Also, the ring gear 212 comprises the inner gear teeth 228 and a supporting portion 229 which holds the inner gear teeth 228 and is rotatably supported on the case 211. The inner gear teeth 228 and the supporting portion 229 are formed integrally with each other and made of casting. Herein, in the ring gear 212, the supporting portion 229 which is provided with the flange portion 217 coupled to a sprocket or the like and the inner gear teeth 228 are formed integrally with each other and made of casting.

The input shaft 213 is driveably coupled to the output shaft 220 of the hydraulic motor 210 via a spline joint 221. Accordingly, the input shaft 213 is rotated together with the output shaft 220. To one end of the input shaft 213 is coupled the sun gear 214 so that the sun gear 214 can rotate with the input shaft 213. Outer peripheral gear teeth 223 are formed at the sun gear 214 so as to be engaged with the first stage planetary gears 224 of the planetary gear mechanism to drive.

The planetary gear mechanism 215 is comprised of two-stage planetary gears which are driven along with the sun gear 214. Namely, it includes the first planetary gears 224, a carrier 225 as a supporting frame (planetary frame), the second (final) stage planetary gears 226, and the holding portion 222 of the planetary gears 226.

Figure 12:
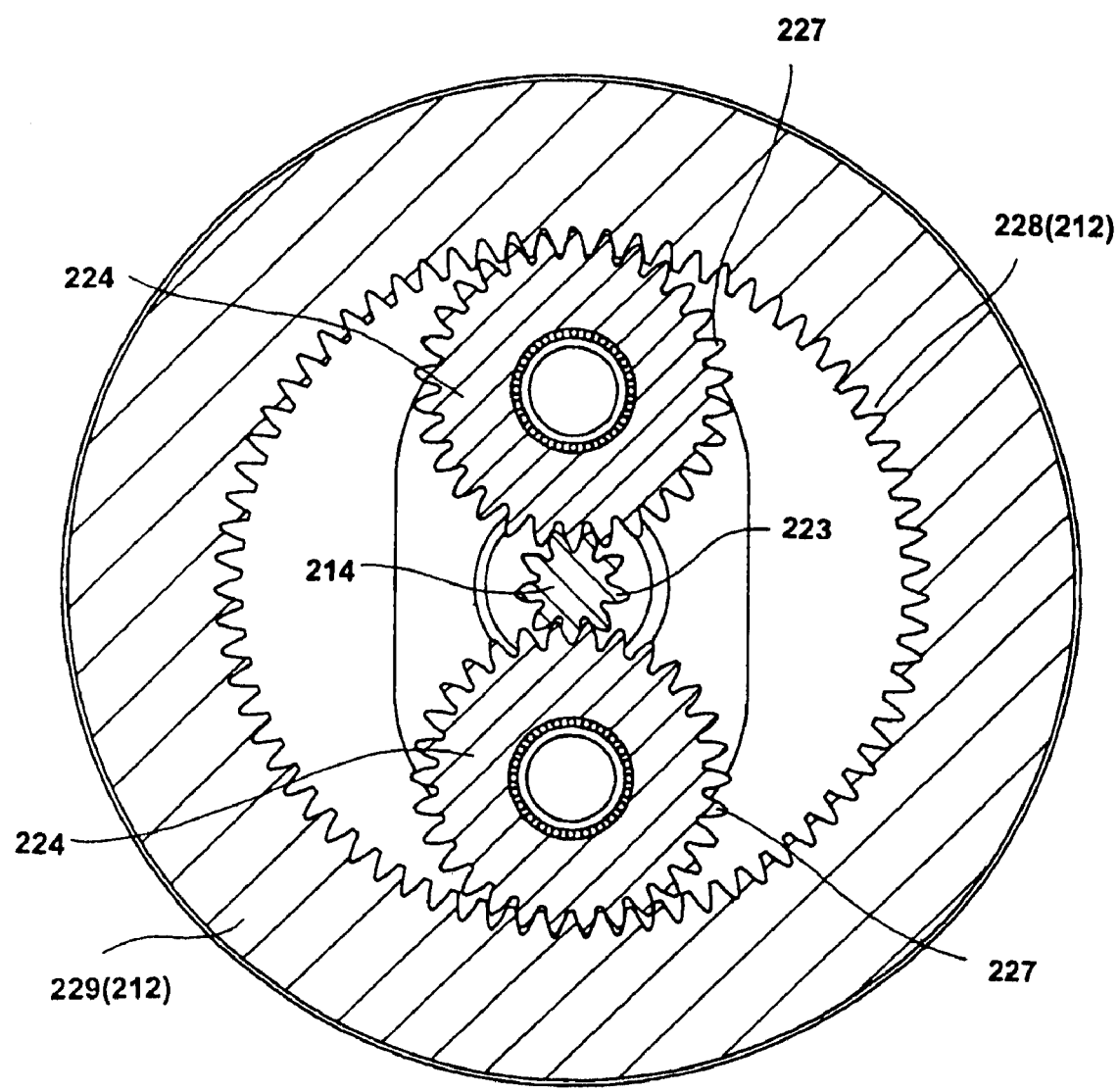
FIG. 12 is a sectional view of the reduction planetary gear taken on line II-II of FIG. 11, showing a ring gear, planetary gears and a sun gear.

FIG. 12 is a sectional view of the reduction planetary gear taken on line II-II of FIG. 11, showing the ring gear 212, the planetary gears 224, the sun gear 214, and a part (a part at the other end) of the carrier 225. As shown in FIGS. 11 and 12, the first stage planetary gears 224 are configured such that two thereof are disposed at opposite sides to each other, putting the sun gear 214 therebetween, and respective planetary gears 224 are rotatably supported on the carrier 225. Outer peripheral gear teeth 227 formed at the planetary gears 224 are engaged with the outer peripheral gear teeth 223 of the sun gear 214 to rotate along with the sun gear 214. Also, the outer peripheral gear teeth 227 of the planetary gears 224 are engaged with the inner gear teeth 228 of the ring gear 212. Thus, according to the rotation of the sun gear 214, the planetary gears 224 move along the inner periphery of the ring gear 212, rotating around their own axes. Also, as shown in FIG. 12, the outer peripheral gear teeth 223 of the sun gear 214, the outer peripheral gear teeth 227 of the planetary gears 224, and the inner gear teeth 212 of the ring gear 228 are all formed of high-tooth, not full depth tooth.

The carrier 225 is, as shown in FIG. 11, comprised of two oval-shaped flat plates which put the two planetary gears 224 therebetween. The carrier 225 comprises two axial portions 230 which interconnect the oval-shaped flat plates, on which the planetary gears 224 are rotatably supported respectively. Accordingly, the planetary gears 224 driven by the sun gear 214 move around the sun gear 214, rotating around the axial portions 230, and thereby the carrier 225 also rotates around the sun gear 214.

Also, inner peripheral gear teeth 231 are formed at an inner periphery of the other-end-side located flat plate of the carrier 225 so as to be engaged with a second sun gear 232. The second sun gear 232 receives the input shaft 213 therein so as to be rotatably supported with respect to the input shaft 213. At the sun gear 232 are formed outer peripheral gear teeth 233 which are engaged with the inner peripheral gear teeth 231 of the carrier 225. Thus, the second sun gear 232 is driven according to a rotation of the carrier 225.

The final stage planetary gears 226 are rotatably supported on axial portions 235 provided at the holding portion 222. Three planetary gears 226 are disposed in the circumferential direction at regular intervals. At the planetary gears 226 are formed outer peripheral gear teeth 234, which are engaged with the outer peripheral gear teeth 233 of the second sun gear 232 and the inner gear teeth 228 of the ring gear 212. Thus, as the second sun gear 232 rotates, the planetary gears 226 rotate around the axial portions 235 (without moving around the sun gear), and thereby the ring gear 212 is rotated by the rotation of the planetary gears 226.

Figure 13:
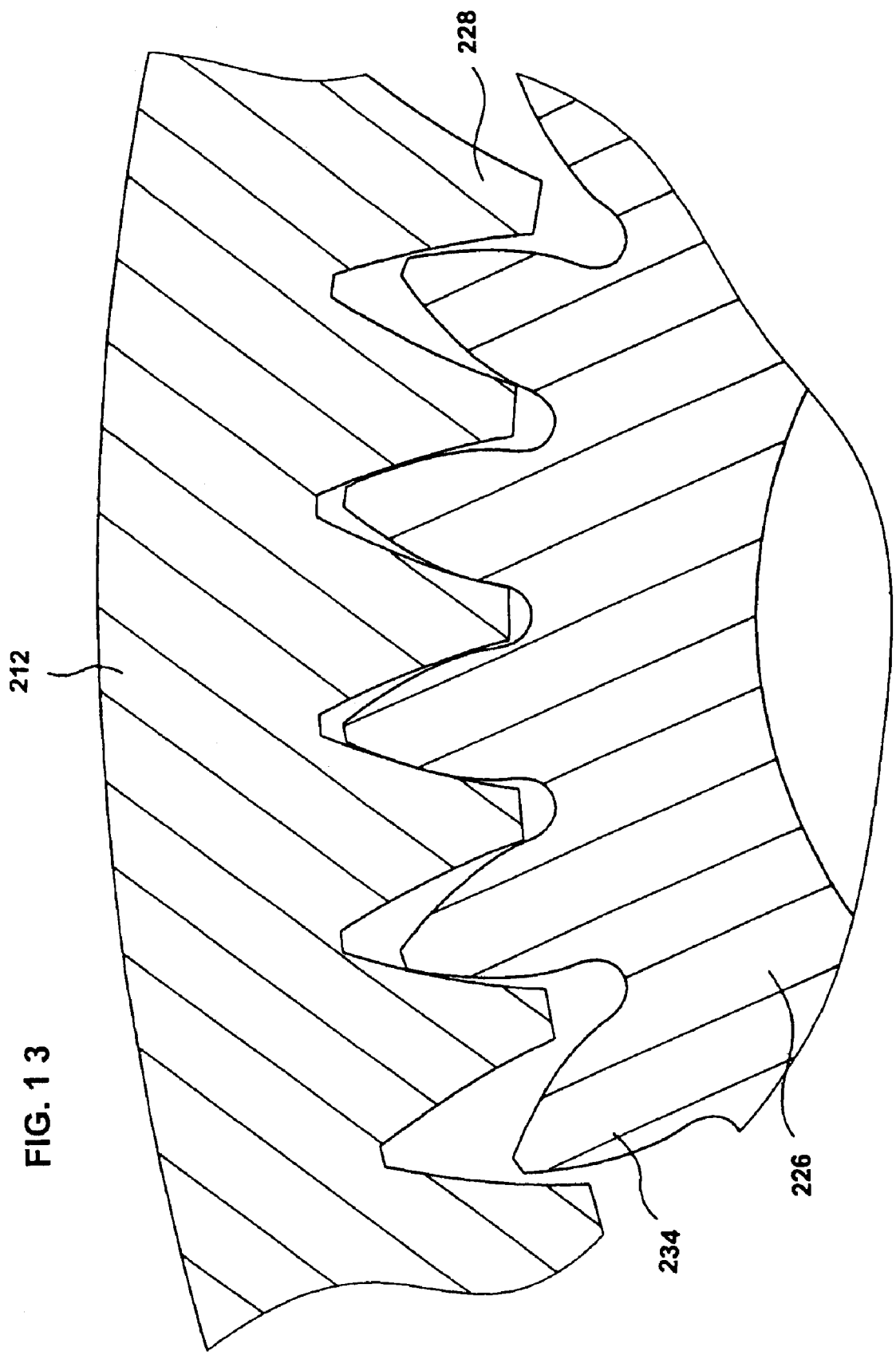
FIG. 13 is a partially enlarged sectional view of the reduction planetary gear taken on line III of FIG. 11, showing an engagement state of the planetary gear and the ring gear.

FIG. 13 is a partially enlarged sectional view of the reduction planetary gear taken on line III of FIG. 11, showing the engagement state of the planetary gear 226 and the ring gear 212. As shown in FIG. 13, the inner gear teeth 228 of the ring gear 212 and the respective teeth 234 of the planetary gears 226 which are engaged with the ring gear 212 are formed of high-tooth. Herein, the inner gear teeth 228 and the planetary gears 226 are engaged continuously with each other via two or more pairs of gear teeth thereof, and thereby a state of gear tooth engagement ratio of 2.0 or more is maintained.

Finally, the holding portion 222 is coupled to the one end of the case 211 via a spline joint to be fixed to the case 211. Also, there are provided three axial portions 235 in the circumferential direction at regular intervals, and, as described above, the respective axial portions 235 rotatably support the planetary gears 226.

As described above, according to the reduction planetary gear 201, since the inner gear teeth 228 of the ring gear 212 and the respective gear teeth 234 of the planetary gears 226 engaged with the ring gear 212 are formed of high-tooth and the gear tooth engagement thereof is configured so as to be 2.0 or more, the force (load) applied to the inner gear teeth 228 of the ring gear 212 are continuously dispersed into two or more gear teeth. Thus, the contact face pressure and the bending stress occurring to the gear teeth can be reduced. Accordingly, maintaining of strength of the inner gear teeth 228 of the ring gear 212 can be achieved properly, resulting in no necessity of any improper treatments for hardening the inner gear teeth 228. Also, there may be no necessity of keeping the tooth width long in the axial direction without such hardening treatments. The ring gear 212 can be manufactured by casting easily. Thereby, any limitations in work loads for manufacturing and in designing structures for the reduction planetary gear can be reduced properly.

Further, although the conventional reduction planetary gear includes the first stage planetary gears with three or more of planetary gears, according to the above-described reduction planetary gear 201 even though the first sage planetary gears 224 are configured of two planetary gears, the contact face pressure and the bending stress occurring to respective gear teeth can be reduced by forming the outer peripheral gear teeth 227 of high-tooth. Thus, the number of the planetary gears can be reduced, and the contact face pressure and the bending stress occurring to the inner gear teeth 228 of the ring gear 212 can be reduced by the engagement with the first stage planetary gears 224. As a result, maintaining of a sufficient strength of the inner gear teeth 228 can be achieved properly, any improper treatments for hardening the inner gear teeth 228 can be omitted, and the tooth width of the inner gear teeth 228 can be prevented from becoming longer in the axial direction.

Further, since the maintaining of a sufficient strength of the inner gear teeth 228 of the ring gear 212 can be achieved properly without applying any improper hardening treatments, the ring gear 212 and the supporting portion 229 can be formed integrally with each other and made of casting, unlike the conventional reduction planetary gear having a structural limitation of splitting thereof for the hardening. Further, reduction of the number of parts can be obtained by omitting, for example, bolts for interconnecting the ring gear 212 and the supporting portion 229, along with avoidance of such hardening treatments.

Further, since a process of such hardening treatments can be omitted, no strain caused by the treatments occurs to the ring gear, and thereby a stable load can be applied to the gear teeth continuously. As a result, a durability of the reduction planetary gear can be improved and gear noise from that can be suppressed.

Herein, although the reduction planetary gear 201 including the two-stage planetary gears has been described, the same functions and effects as those of the above-described reduction planetary gear 201 may be obtained with regard to a reduction planetary gear including three or more stages of planetary gears in which the gear tooth engagement ratio thereof of 2.0 or more.

Herein, any other modifications or improvements can be applied to the reduction planetary gear within a scope of the claimed invention as follows.

(1) The planetary gear mechanism may be configured of one-stage planetary gears, in which planetary gears with one stage rotate only around their own axes and the ring gear is driven via its gear tooth engagement with the planetary gears. Herein, such a configuration that the gear teeth of the planetary gears an the inner gear teeth of the ring gear are formed of high-tooth and the gear tooth engagement ratio is 2.0 or more can also reduce the contact face pressure and the bending stress occurring to the inner gear teeth of the ring gear as well, thereby providing the same functions and effects as those of the above-described embodiment.

(2) The above-described reduction planetary gear are configured such that the first stage planetary gears are formed of two thereof and the final stage ones are formed of three thereof. However, other modifications may be adopted instead, in which the first stage planetary gears are formed of three or more thereof and the final stage ones are formed of four or more thereof. Herein, in the case where there are provided three or more first stages of planetary gears, the outer peripheral gear teeth thereof may not necessarily formed of high-tooth.

What is claimed is:

1. A reduction planetary gear comprising:
an input shaft driveably connected to an output shaft of a motor;
a sun gear driveably connected to said input shaft;
a planetary gear mechanism including two or more stages of planetary gears which are driveably engaged with said sun gear;
a ring gear including inner gear teeth which are formed inside thereof and driveably engaged with first stage planetary gears and final stage planetary gears of said planetary gear mechanism; and
a case rotatably supporting said ring gear,
wherein gear teeth of the final stage planetary gears and the inner gear teeth of said ring gear driveably engaged with the final stage planetary gears are formed of high-tooth, an engagement ratio of said gear teeth of the final stage planetary gears and said inner gear teeth of the ring gear is configured so as to be 2.0 or more, and said sun gear, which is driveably engaged with the final stage planetary gears of said planetary gear mechanism, is configured such that a gear tooth base thereof is formed of high-tooth, while a gear tooth end thereof is formed of full depth tooth,
wherein gear teeth of other planetary gears than said final stage planetary gears of said planetary gear mechanism including plural stages of planetary gears are formed of full depth tooth.

* * * * *